(12) United States Patent
Cha et al.

(10) Patent No.: US 12,548,805 B2
(45) Date of Patent: Feb. 10, 2026

(54) BATTERY MODULE, MANUFACTURING METHOD THEREOF AND BATTERY PACK

(71) Applicant: LG ENERGY SOLUTION, LTD., Seoul (KR)

(72) Inventors: In Seok Cha, Daejeon (KR); Chan Kyu Lee, Daejeon (KR); Minsung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 543 days.

(21) Appl. No.: 17/928,590

(22) PCT Filed: Oct. 14, 2021

(86) PCT No.: PCT/KR2021/014269
§ 371 (c)(1),
(2) Date: Nov. 29, 2022

(87) PCT Pub. No.: WO2022/080906
PCT Pub. Date: Apr. 21, 2022

(65) Prior Publication Data
US 2023/0238588 A1  Jul. 27, 2023

(30) Foreign Application Priority Data

Oct. 14, 2020 (KR) .................. 10-2020-0132499

(51) Int. Cl.
*H01M 10/42* (2006.01)
*H01M 10/48* (2006.01)
(Continued)

(52) U.S. Cl.
CPC ....... *H01M 10/425* (2013.01); *H01M 10/486* (2013.01); *H01M 50/204* (2021.01); *H01M 50/284* (2021.01); *H01M 50/505* (2021.01)

(58) Field of Classification Search
CPC ............. H01M 10/425; H01M 50/505; H01M 50/204; H01M 50/284
See application file for complete search history.

(56) References Cited

U.S. PATENT DOCUMENTS

2006/0176584 A1    8/2006  Kawamura et al.
2011/0195284 A1*   8/2011  Yasui .................. H01M 50/227
                                                                429/82
(Continued)

FOREIGN PATENT DOCUMENTS

CN     108767178 A    11/2018
EP     3637495 A1      4/2020
(Continued)

OTHER PUBLICATIONS

The decision of KPO to grant a Patent for Application KR 20200132499 (Year: 2024).*
(Continued)

*Primary Examiner* — Alexander Usyatinsky
(74) *Attorney, Agent, or Firm* — Bryan Cave Leighton Paisner LLP (57) ABSTRACT

A battery module including a battery cell stack, which includes a plurality of battery cells; a busbar frame mounted on each of a front surface and a rear surface of the battery cell stack; a flexible printed circuit board unit to which a temperature sensor for measuring the temperature of the battery cell stack is attached; and a reinforcing sheet attached to the flexible printed circuit board unit.

11 Claims, 5 Drawing Sheets

(51) Int. Cl.
   *H01M 50/204*   (2021.01)
   *H01M 50/284*   (2021.01)
   *H01M 50/505*   (2021.01)

(56) References Cited

U.S. PATENT DOCUMENTS

| | | |
|---|---|---|
| 2013/0000957 A1 | 1/2013 | Ikeda et al. |
| 2014/0335378 A1 | 11/2014 | Kuroda |
| 2016/0372796 A1 | 12/2016 | Nishihara |
| 2019/0001838 A1 | 1/2019 | Choi et al. |
| 2019/0131596 A1* | 5/2019 | Yang ................... H01M 50/224 |
| 2019/0348720 A1 | 11/2019 | Oh et al. |
| 2019/0389318 A1 | 12/2019 | Lee et al. |
| 2020/0091494 A1 | 3/2020 | Fernandez-Galindo et al. |
| 2020/0203782 A1 | 6/2020 | Yoon |
| 2020/0411924 A1* | 12/2020 | Yun ..................... H01M 50/298 |
| 2021/0313657 A1 | 10/2021 | Park et al. |
| 2022/0247004 A1 | 8/2022 | Yun |

FOREIGN PATENT DOCUMENTS

| | | | |
|---|---|---|---|
| EP | 3671895 A1 | 6/2020 | |
| JP | 2006-215420 A | 8/2006 | |
| JP | 2010-140695 A | 6/2010 | |
| JP | 2014-220157 A | 11/2014 | |
| JP | 2016-018634 A | 2/2016 | |
| JP | 2020-514976 A | 5/2020 | |
| JP | 2020-523749 A | 8/2020 | |
| KR | 10-2015-0040444 A | 4/2015 | |
| KR | 10-1723037 B1 | 4/2017 | |
| KR | 10-1750489 B1 | 6/2017 | |
| KR | 10-1829350 B1 | 2/2018 | |
| KR | 10-2018-0038253 A | 4/2018 | |
| KR | 10-2018-0078776 A | 7/2018 | |
| KR | 10-2019-0051297 A | 5/2019 | |
| KR | 10-2019-0061378 A | 6/2019 | |
| KR | 10-2020-0040619 A | 4/2020 | |
| KR | 10-2087699 B1 | 4/2020 | |
| KR | 10-2161215 B1 | 9/2020 | |
| WO | 2015-107583 A | 7/2015 | |
| WO | WO-2018124494 A2 * | 7/2018 | ............. G01R 31/36 |

OTHER PUBLICATIONS

The decision of JPO to grant a Patent for Application JP 2022571314 (Year: 2025).*

* cited by examiner

BATTERY MODULE, MANUFACTURING METHOD THEREOF AND BATTERY PACK

CROSS-REFERENCE TO RELATED APPLICATIONS

This application is a US national phase on international Application No. PCT/KR2021/014269 filed on Oct. 14, 2021, and claims the benefit of Korean Patent Application No. 10-2020-0132499 filed on Oct. 14, 2020 with the Korean Intellectual Property Office, the disclosures of which are incorporated herein by reference in their entirety.

TECHNICAL FIELD

The present disclosure relates to a battery module and a manufacturing method thereof, and more particularly to a battery module including a temperature sensor with improved assembling property and a manufacturing method thereof.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack having a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module includes a battery cell stack in which a plurality of battery cells are stacked, a housing for the battery cell stack, and a busbar frame that covers the front and rear surfaces of the battery cell stack.

A temperature sensor for measuring heat generated from a plurality of battery cells of the battery cell stack may be required, and the temperature sensor needs to be assembled in a portion adjacent to the battery cell stack while minimizing interference with peripheral components. In addition, the temperature sensor assembly structure itself needs to optimized for the battery module structure and contributes to ensuring the performance of the battery module.

SUMMARY

It is an objective of the present disclosure to provide a battery module including a simpler and more optimized coupling structure including a temperature sensor, and a manufacturing method thereof.

The objectives of the present disclosure are not limited to the aforementioned objectives, and other objectives which are not described herein should be clearly understood by those skilled in the art from the following detailed description.

In order to achieve the above objectives, according to one exemplary embodiment of the present disclosure, there is provided a battery module comprising: a battery cell stack in which a plurality of battery cells are stacked; a busbar frame mounted onto the front and rear surfaces of the battery cell stack; and a flexible printed circuit board unit to which a temperature sensor for measuring the temperature of the battery cell stack is attached, wherein a reinforcing sheet is attached to the flexible printed circuit board unit.

The flexible printed circuit board unit may be held on the busbar frame.

The flexible printed circuit board unit may protrude toward the upper end of the busbar frame.

The reinforcing sheet may be a polycarbonate sheet.

The reinforcing sheet may be attached to the opposite side of one surface of the flexible printed circuit board unit to which the temperature sensor is attached.

A frame part may be formed at the upper end of the busbar frame, and the flexible printed circuit board unit may be held by the frame part.

A hole may be formed at the lower part of the frame part, and the flexible printed circuit board unit may pass through the busbar frame via the hole.

A holding part for holding the flexible printed circuit board unit in place may be formed on the upper part of the frame part.

One side of the holding part may be open.

A jaw part protruding toward the open port may be formed on the side of the holding part that is open.

The battery module further comprises a housing that houses the battery cell stack and has an upper part that is open; and an upper plate that covers an upper surface of the battery cell stack, wherein the temperature sensor is disposed between the upper plate and the upper surface of the battery cell stack, and the upper plate is coupled to the housing and fixes the position of the temperature sensor.

According to another exemplary embodiment of the present disclosure, there is provided a method of manufacturing a battery module, comprising the steps of: holding a flexible printed circuit board unit mounted with a temperature sensor on the frame part of the busbar frame; mounting the busbar frame onto the front and rear surfaces of the battery cell stack; and separating the flexible printed circuit board unit from the frame part and seating it on the upper surface of the battery cell stack.

According to yet another exemplary embodiment of the present disclosure, there is provided a battery pack comprising the above-mentioned battery module.

A battery module and a manufacturing method thereof according to one exemplary embodiment of the present disclosure can easily attach the temperature sensor onto the battery cell stack through a temperature sensor coupling structure using a reinforcing sheet. In addition, since the flexible printed circuit board (FPC) can be held on the holding structure, the assembling property of the FPC can be improved.

The effects of the present disclosure are not limited to the effects mentioned above and additional other effects not described above will be clearly understood from the description of the appended claims by those skilled in the art.

DETAILED DESCRIPTION

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Now, the battery module according to an exemplary embodiment of the present disclosure will be described with reference to FIGS. 1 to 6.

Figure 1:
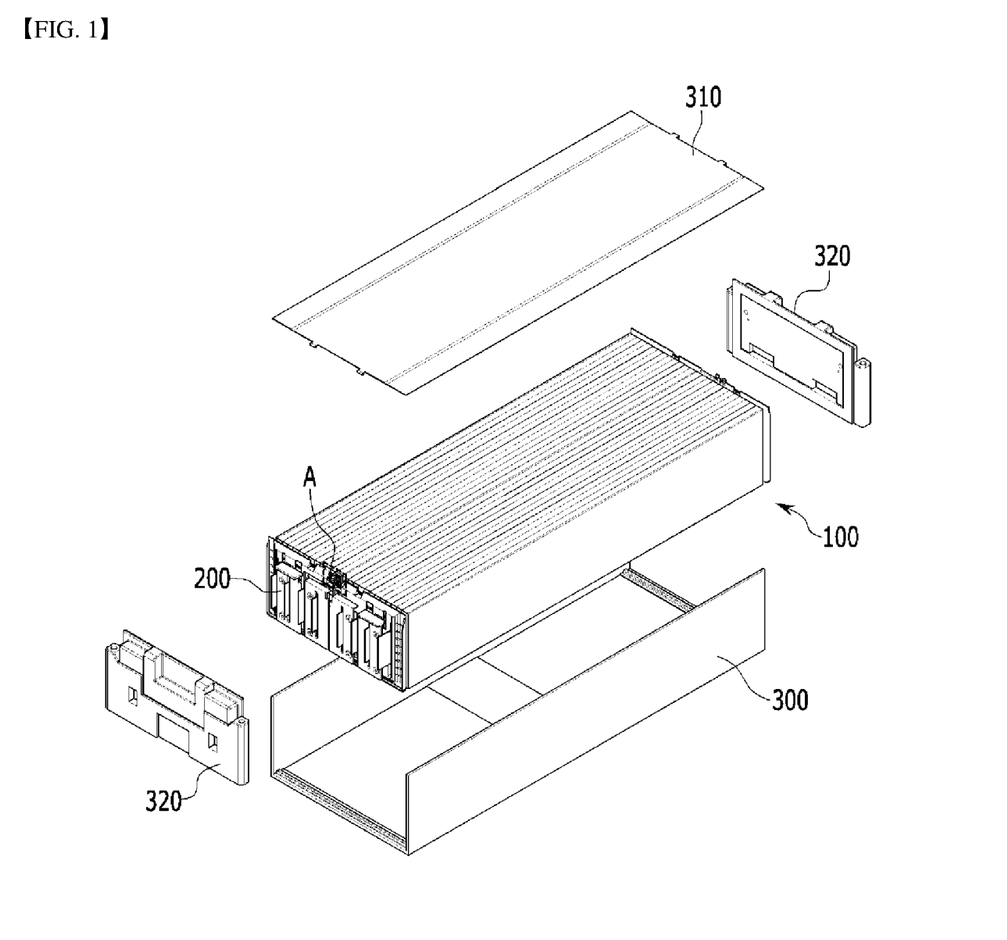
FIG. 1 is an exploded perspective view of a battery module according to an exemplary embodiment of the present disclosure.
Figure 2:
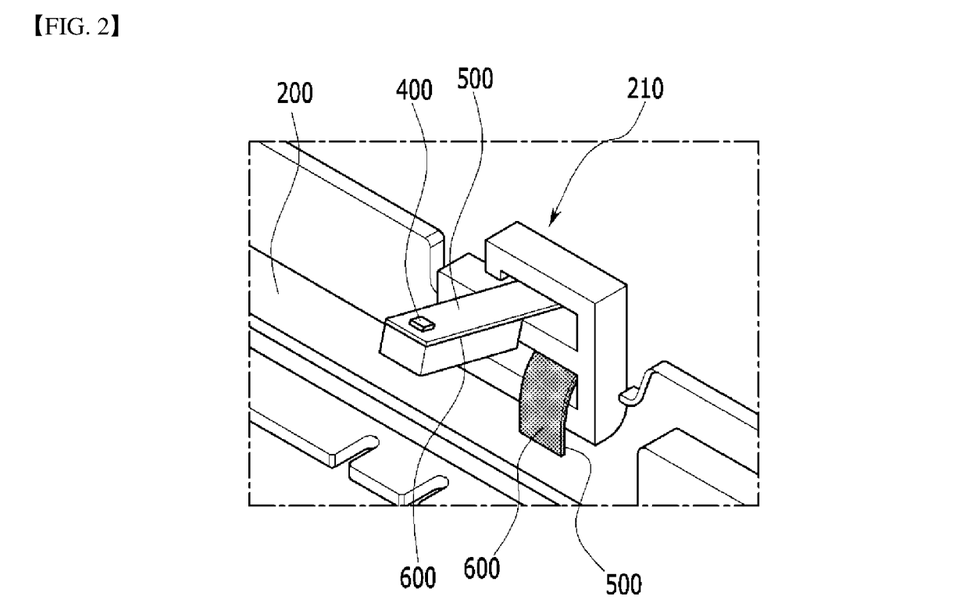
FIG. 2 is a view of section A of FIG. 1, showing a temperature sensor and a flexible printed circuit board held by a holding part of a busbar frame according to an exemplary embodiment of the present disclosure.
Figure 3:
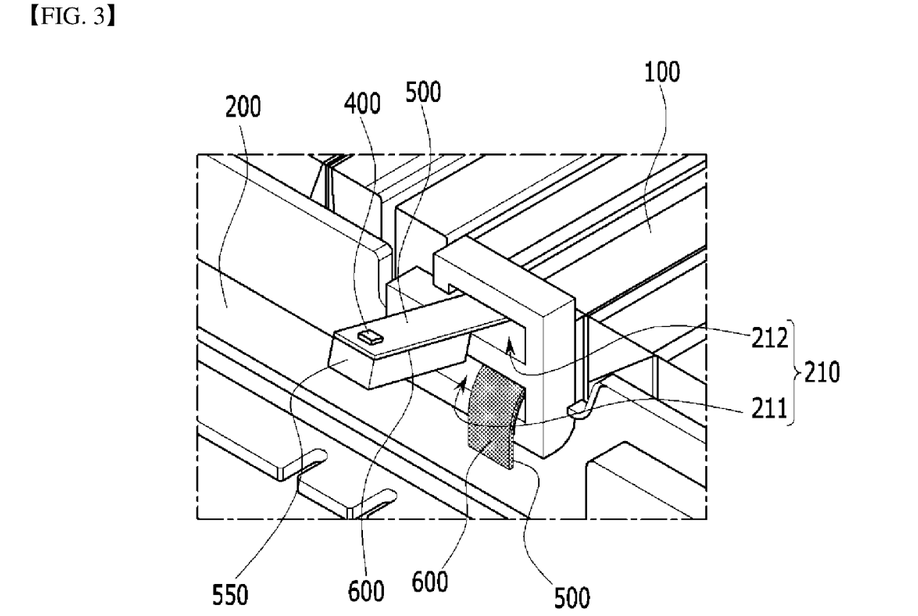
FIG. 3 is a view of section A of FIG. 1, showing the busbar frame coupled to the battery cell stack of FIG. 2.
Figure 4:
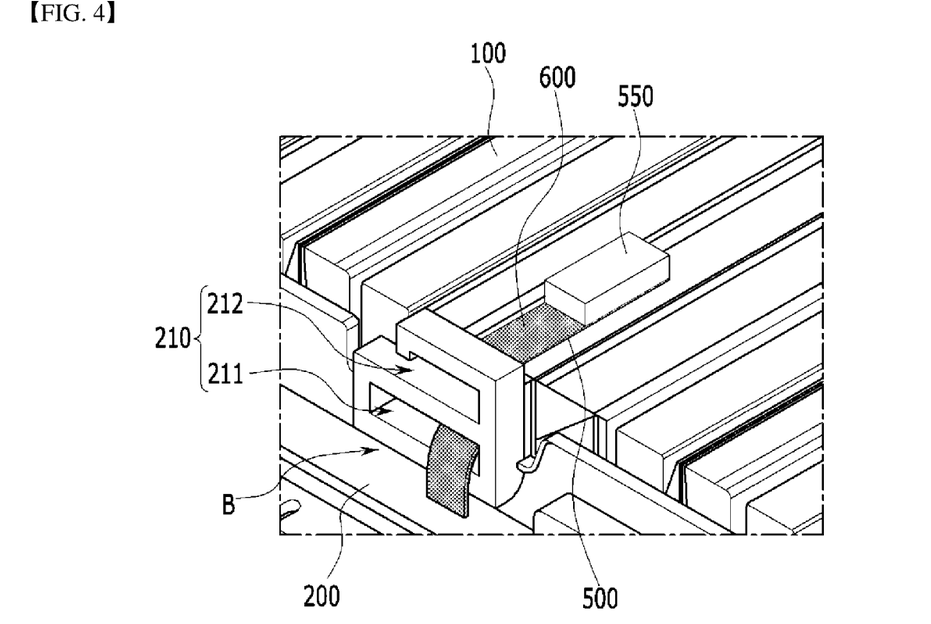
FIG. 4 is an illustration of the temperature sensor placed on the upper surface of the battery cell stack of FIG. 3.
Figure 5:
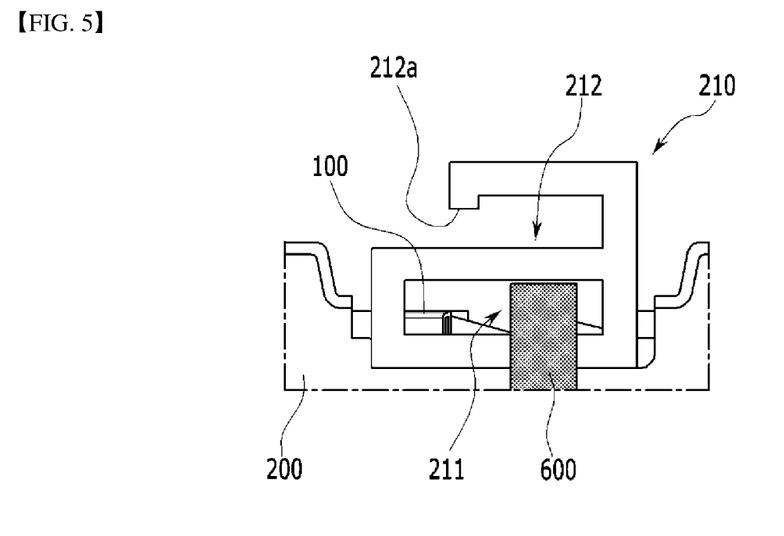
FIG. 5 is a view of FIG. 4 as viewed from the front of the frame part.
Figure 6:
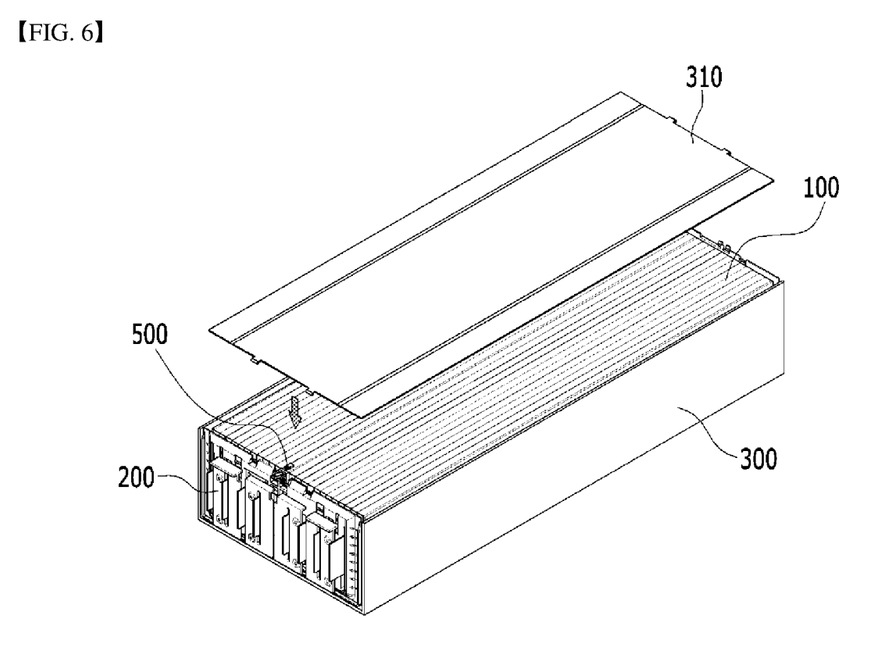
FIG. 6 is a view of the upper frame of FIG. 4.

FIG. 1 is an exploded perspective view of a battery module according to an exemplary embodiment of the present disclosure. FIG. 2 is a view of section A of FIG. 1, which shows a temperature sensor and a flexible printed circuit board held in place by a holding part of a busbar frame according to an exemplary embodiment of the present disclosure. FIG. 3 is a view of section A of FIG. 1, which shows the busbar frame coupled to the battery cell stack. FIG. 4 is an illustration of the temperature sensor placed on the upper surface of the battery cell stack of FIG. 3. FIG. 5 is a view of FIG. 4 as viewed from the front of the frame part. FIG. 6 is an illustration of the upper frame of FIG. 4.

As illustrated in FIGS. 1 to 6, the battery module according to an exemplary embodiment of the present disclosure includes a battery cell stack 100 in which a plurality of battery cells are stacked; a busbar frame 200 mounted onto the front and rear surfaces of the battery cell stack 100; and a temperature sensor 400 that regulates a placement position through a holding structure of the busbar frame 200. The temperature sensor 400 can measure the temperature of the battery cell stack 100. The holding structure of the busbar frame 200 may be realized by a frame part 210 as shown in the figure, and the frame part 210 may include a hole 211 and a holding part 212. According to the present embodiment, the temperature sensor 400 can be formed on the flexible printed circuit board unit 500 to which the reinforcing sheet 600 is attached. A pad part 550 can be formed on the opposite side of one surface of the flexible printed circuit board unit 500 on which the temperature sensor 400 is formed. The reinforcing sheet 600 according to the present embodiment may be a PC (polycarbonate) sheet.

The battery cell is a secondary battery and can be configured as a pouch type secondary battery. The battery cells can be configured by a plurality of numbers, and the plurality of battery cells can be stacked to be electrically connected to each other, thereby forming a battery cell stack 100. The plurality of battery cells may include an electrode assembly, a battery case, and an electrode lead protruding from the electrode assembly, respectively.

The housing 300 houses the battery cell stack 100. The battery cell stack 100 housed inside the housing 300 can be physically protected through the housing 300. The housing 300 includes a bottom part and two side parts, and can cover the bottom surface and both side surfaces of the battery cell stack 100.

A busbar frame 200 is formed to cover the front and rear surfaces of the battery cell stack 100, is disposed on the front and rear surfaces of the battery cell stack 100, and can be connected with electrode leads formed to extend from the plurality of battery cells. More specifically, the electrode leads extend by passing through the busbar frame 200 and are coupled to the plurality of busbars mounted onto the outside surface of the busbar frame 200, and thus the battery cells and the busbars can be electrically connected to each other.

The end plates 320 are respectively formed on the outside of the busbar frame 200 on the basis of the battery cell stack 100, so that they can cover the battery cell stack 100 and the busbar frame 200. The end plates 320 can protect the busbar frame 200, the battery cell stack 100, and various electrical equipment connected thereto from external impacts, and at the same time, guide the electrical connection between the battery cell stack 100 and an external power. An insulating member (not shown) can be inserted between the end plate 320 and the busbar frame 200. The insulating member can cut off the electrical connection between the busbar frame 200 and the outside to ensure the insulation performance of the battery module.

The temperature sensor 400 can measure the temperature of the battery cell stack 100. According to the present embodiment, the busbar frame 200 and the temperature sensor 400 can be connected by a reinforcing sheet 600. In this arrangement, the temperature sensor 400 is attached to one surface of the flexible printed circuit board unit 500, and the reinforcing sheet 600 can be attached to the opposite side of the one surface of the flexible printed circuit board unit 500 through an adhesive member. The adhesive member may be a double-sided tape.

Figure 7:
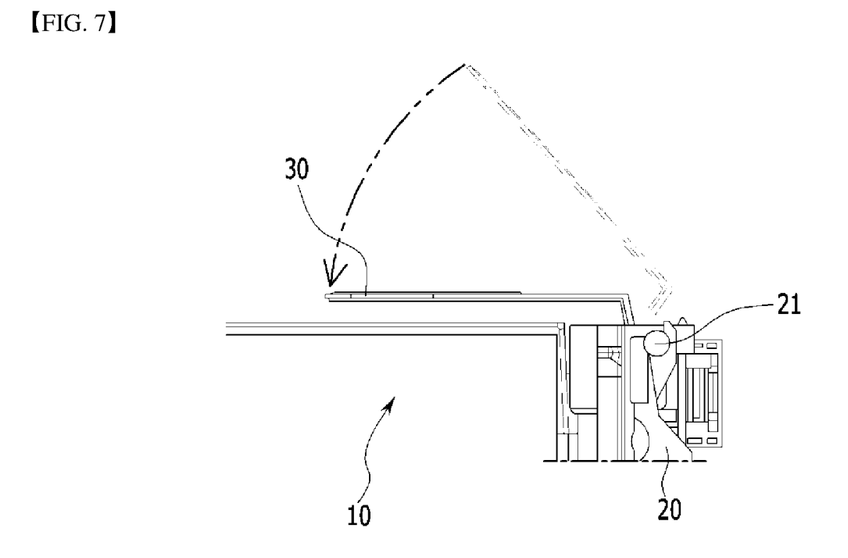
FIG. 7 is a view of a temperature sensor placed on the upper surface of the battery cell stack through rotation as a comparative example.

FIG. 7 is a view of a temperature sensor placed on the upper surface of the battery cell stack through rotation as a comparative example.

As illustrated in FIG. 7, the battery module according to the comparative example of the present disclosure is configured such that a rotating shaft 21 is formed at the upper end of the busbar frame 20 that covers the side surface of the battery cell stack 10, and a temperature sensor unit 30 including an FPC and a temperature sensor can be coupled to the rotating shaft 21. According to the comparative example, the temperature sensor unit 30 connected with the rotating shaft 21 can be placed on the upper surface of the battery cell stack 10 through the rotation of the rotating shaft 21, thereby measuring the temperature of the battery cell stack 10.

However, in the case of a rotating shaft coupling structure as in the comparative example, since a separate rotating shaft structure must be produced at the upper end of the busbar frame 20, the structure of the busbar frame 20 becomes considerably complicated, and interference with peripheral components may occur in the process of placing the temperature sensor unit by rotation.

Thus, according to the present embodiment, because the flexible printed circuit board unit 500, whose rigidity is supplemented by the reinforcing sheet 600, maintains its holding shape through the frame part 210 of the busbar frame, it is possible to eliminate an interference phenomenon that may occur in the rotary coupling structure as in the comparative example. Furthermore, because the structure is easily held and placed using a novel holding structure of the busbar frame 200, it is possible to easily move and hold the flexible printed circuit board unit 500 onto which the temperature sensor 400 is mounted.

The reinforcing sheet 600 may assist the rigidity of the flexible printed circuit board unit 500 to maintain a holding state of the flexible printed circuit board unit 500 described later. Further, even when the flexible printed circuit board unit 500 is placed on the upper surface of the battery cell stack 100, it is possible to prevent distortion of the flexible printed circuit board unit 500 through the rigidity of the reinforcing sheet 600.

As illustrated in FIGS. 4 and 5, the flexible printed circuit board unit 500 according to the present embodiment may be attached to the busbar frame 200. The flexible printed circuit board unit 500 according to the present embodiment may be attached to the upper end part of the busbar frame 200. The flexible printed circuit board unit 500 can be attached to the upper end of the busbar frame 200 through the holding structure of the busbar frame 200. The busbar frame 200 according to the present embodiment may include a frame part 210 formed to protrude on the upper side of the busbar frame 200 at the upper end. A hole 211 is formed in the lower part of the frame part 210, and the flexible printed circuit board unit 500 may pass through the busbar frame 200 through the hole 211. The flexible printed circuit board unit 500 may pass toward the upper surface or the upper end part of the busbar frame 200 through the hole part 211.

Further, a holding part 212 for holding the flexible printed circuit board unit 500 is formed at the upper part of the frame part 210, one side of the holding part 212 is open, and a jaw part 212a formed to protrude toward the open part may be formed on the open side of the holding part 212.

Therefore, the flexible printed circuit board unit 500 passes through the hole 211 of the frame part 210 formed in the busbar frame 200, and at the same time, the flexible printed circuit board unit 500 may be attached to the hollow holding part 212 located on the upper side of the hole part 211.

Thereby, before assembling the battery cell stack 100, the flexible printed circuit board unit 500 is placed on the holding part 212, and after assembling the battery cell stack 100, the flexible printed circuit board unit 500 comes off from the holding part 212 through a one-side opening of the holding part 212, and comes into contact with the upper surface of the battery cell stack 100. Through such an installation process, it is possible to avoid interference that may occur when assembling the battery module.

The jaw part 212a shown in FIG. 5 is formed to prevent the flexible printed circuit board unit 500 disposed to be held on the holding part 212 from easily detaching to the outside of the holding part 212.

FIG. 6 shows the upper plate 310 placed on the upper surface of the battery cell stack 100 on which the temperature sensor 400 is disposed. As shown in FIG. 6, the temperature sensor 400 is disposed between the upper plate 310 and the upper surface of the battery cell stack 100, the upper plate 310 is coupled to the housing 300, and the temperature sensor 400 disposed between the battery cell stack 100 and the upper plate 310 can be disposed and fixed at a set mounting position.

Hereinafter, a method of manufacturing a battery module according to an exemplary embodiment of the present disclosure will be described with reference to FIGS. 1 to 4.

As illustrated in FIGS. 1 to 4, the manufacturing method of the battery module according to an exemplary embodiment of the present disclosure sequentially proceeds with a step of mounting the flexible printed circuit board unit 500, which protrudes toward the upper end or the upper end part of the busbar frame 200 shown in FIG. 2 and is mounted with the temperature sensor 400, on the frame part 210 of the busbar frame 200, a step of mounting the busbar frame 200 onto the front and rear surfaces of the battery cell stack 100 shown in FIG. 3, and a step of separating the flexible printed circuit board unit 500 shown in FIG. 4 from the frame part 210 and seating it on the upper surface of the battery cell stack 100.

According to the present embodiment, after the step of separating the flexible printed circuit board unit 500 from the frame part 210 and seating it on the upper surface of the battery cell stack 100, the method may further include a step of coupling the upper plate 310 to the upper surface of the battery cell stack 100. Thereby, the temperature sensor 400 disposed between the upper plate 310 and the upper surface of the battery cell stack 100 can be mounted and fixed at a set position.

The battery modules described above can be included in a battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications can be carried out by those skilled in the art, without deviating from the spirit and scope of the principles of the invention described in the appended claims. Further, these modified embodiments should not be understood individually from the technical spirit or perspective of the present disclosure.

The invention claimed is:

1. A battery module comprising:
   a battery cell stack comprising a plurality of battery cells;
   a busbar frame mounted onto each of a front surface and a rear surface of the battery cell stack;
   a flexible printed circuit board unit;
   a temperature sensor for measuring the temperature of the battery cell stack attached to the flexible printed circuit board unit; and
   a reinforcing sheet attached to the flexible printed circuit board unit,
   wherein an upper end of the busbar frame comprises a frame part,
   wherein the flexible printed circuit board unit is held in position by the frame part, and
   wherein an upper part of the frame part comprises a holding part for holding the flexible printed circuit board unit in place.

2. The battery module according to claim 1,
   wherein the flexible printed circuit board unit is placed on the busbar frame.

3. The battery module according to claim 1,
   wherein the flexible printed circuit board unit protrudes toward an upper end of the busbar frame.

4. The battery module according to claim 1,
   wherein the reinforcing sheet is a polycarbonate sheet.

5. The battery module according to claim 1,
   wherein the temperature sensor is attached to a first surface of the flexible printed circuit board unit,
   wherein the reinforcing sheet is attached to a second surface of the flexible printed circuit board unit, and
   wherein the first surface of the flexible printed circuit board is opposite to the second surface of the flexible printed circuit board.

6. The battery module according to claim 1,
   wherein a lower part of the frame part comprises a hole, and
   wherein the flexible printed circuit board unit passes through the hole.

7. The battery module according to claim 1,
   wherein the holding part includes an opening.

8. The battery module according to claim 7,
   wherein the holding part comprises a jaw part protruding toward the opening.

9. The battery module according to claim 1, further comprising:
   a housing for the battery cell stack, and
   an upper plate covering an upper surface of the battery cell stack,
   wherein an upper part of the housing is open,
   wherein the temperature sensor is disposed between the upper plate and the upper surface of the battery cell stack, and
   wherein the upper plate is coupled to the housing and fixes the position of the temperature sensor.

10. A method of manufacturing a battery module, comprising:
    holding a flexible printed circuit board unit mounted with a temperature sensor on a frame part of the busbar frame;
    mounting the busbar frame onto each of a first surface and a rear surface of the battery cell stack; and
    separating the flexible printed circuit board unit from the frame part and placing the flexible printed circuit board on an upper surface of the battery cell stack.

11. A battery pack comprising the battery module according to claim 1.

* * * * *